United States Patent
Chen

(10) Patent No.: US 7,948,432 B2
(45) Date of Patent: May 24, 2011

(54) ELECTRONIC DEVICE AND METHOD FOR SEARCHING SATELLITES

(75) Inventor: Hung-Sheng Chen, Taipei County (TW)

(73) Assignee: Altek Corporation, Hsinchu (TW)

( * ) Notice: Subject to any disclaimer, the term of this patent is extended or adjusted under 35 U.S.C. 154(b) by 182 days.

(21) Appl. No.: 12/424,734

(22) Filed: Apr. 16, 2009

(65) Prior Publication Data
US 2010/0164799 A1    Jul. 1, 2010

(30) Foreign Application Priority Data

Dec. 31, 2008    (TW) ............................... 97151806 A

(51) Int. Cl.
*G01S 19/06*    (2010.01)
(52) U.S. Cl. .................................................. 342/357.43
(58) Field of Classification Search ............. 342/357.42, 342/357.43
See application file for complete search history.

(56) References Cited

U.S. PATENT DOCUMENTS
7,495,608 B1 *   2/2009   Chen et al. ............... 342/357.43
* cited by examiner

*Primary Examiner* — Thomas H Tarcza
*Assistant Examiner* — Harry Liu
(74) *Attorney, Agent, or Firm* — Tim Tingkang Xia; Morris, Manning & Martin, LLP

(57) ABSTRACT

A method for searching satellites includes obtaining a position information, obtaining a time information, calculating a regional range according to the position information, finding out numbers of target satellites corresponding to the time information and within the regional range from ephemeris data in an ephemeris database, searching the target satellites corresponding to the numbers, and receiving the satellite signals from each searched target satellite. In an electronic device capable of searching satellites, an operation interface is used to output the position information, and a calculation unit is used to calculate the regional range according to the received position information. A look-up unit is electrically connected to the ephemeris database, and used to find out the numbers of the target satellites corresponding to time information and within the regional range from the ephemeris data.

8 Claims, 2 Drawing Sheets

ELECTRONIC DEVICE AND METHOD FOR SEARCHING SATELLITES

CROSS-REFERENCE TO RELATED APPLICATIONS

This application claims priority under 35 U.S.C. §119(a) on Patent Application No. 097151806 filed in Taiwan, R.O.C. on Dec. 31, 2008, the entire contents of which are hereby incorporated by reference.

BACKGROUND

1. Field of Invention

The present invention relates to a searching technique of the satellites, and more particularly to an electronic device capable of searching satellites and method for searching satellites, thereby finding out the target satellites according to the obtained position information and the obtained time information, and then searching the target satellites based on the found-out target satellites and receiving the satellite signal from the searched target satellite.

2. Related Art

A global position system (GPS) is based on a basic principle of triangulation location of satellites. From the positions of the satellites, the distances between the satellites and the electronic device are measured, thereby obtaining the three-dimensional coordinate value of the position of the electronic device. When the electronic device receives one satellite signal, the electronic device can convert the signal into the distance between its position and the satellite by an internal microprocessor. When the electronic device receives two satellite signals, the electronic device can calculate plane coordinate information. When the electronic device receives a third satellite signal, the electronic device can calculate the coordinate information of its position. Normal electronic devices utilize more than four received satellite signals to determine the position and the height of the electronic device. And if five to six satellite signals or more are received by the GPS continuously, more precise location information may be obtained.

Now considering 32 launched satellites in operation, they are uniformly distributed in six orbit planes. The orbit inclination angle is about 55°. The height of the satellites is about 20,183 kilometers. The period of the satellites is 11 hours and 58 minutes. That is, each satellite orbits the earth twice along the same path. Such a design ensures that the user on the earth can see more than four satellites at any place and any time. When being powered on, the electronic device has to detect whether it can receive the signal from the first satellite, and then sequentially detect whether it can receive the signals from the second satellite to the 32nd satellite. The detecting time for each satellite is about 30 seconds. As such, the user has to wait a very long period of powering on time until all of the 32 satellites have been detected.

SUMMARY

In view of the above problems, the present invention is an electronic device capable of searching satellites and a method for searching satellites, thereby finding out the target satellites according to the obtained position information and the obtained time information, and then searching the target satellites based on the found-out target satellites and receiving the satellite signals from the searched target satellite(s). Therefore, the satellites that are not likely to appear currently and overhead are excluded, such that the time for searching the satellites is reduced.

Therefore, the present invention provides a method for searching satellites, which is applied in an electronic device. The method comprises obtaining a position information, obtaining a time information, calculating a regional range according to the position information, finding out a plurality of numbers of target satellites corresponding to the time information and within the regional range from ephemeris data in an ephemeris database, searching the target satellites corresponding to the numbers in reality, and receiving satellite signals from each searched target satellites.

The position information may include a longitude and a latitude of the current position of the electronic device.

In addition, the time information may be a system time of the electronic device.

Moreover, the ephemeris data described above may include a plurality of numbers for numbering a plurality of satellites actually circulating in the sky and a plurality of orbit parameters. The numbers in the ephemeris data are not repetitive and correspond to the satellites in the sky, respectively. The orbit parameters may be a plurality of traveling tracks corresponding to the satellites, a plurality of time parameters corresponding to the satellites, and a plurality of position parameters corresponding to the satellites.

In another aspect of the present invention, the present invention is directed to an electronic device capable of searching satellites.

The electronic device capable of searching satellites includes an operation interface, an ephemeris database, a calculation unit, and a look-up unit. The operation interface is used to output position information. The ephemeris database is used to store the ephemeris data of the satellites. The calculation unit is used to compute a regional range according to the received position information. The look-up unit is electrically connected to the ephemeris database, and used to find out the numbers of target satellites corresponding to the time information and within the regional range from the ephemeris data.

The position information may include a longitude and a latitude of the current position of the electronic device.

In addition, the time information may be a system time of the electronic device.

Moreover, the ephemeris data described above may include a plurality of numbers for numbering a plurality of satellites actually circulating in the sky and a plurality of orbit parameters. The numbers in the ephemeris data are not repetitive and correspond to the satellites in the sky, respectively. The orbit parameters may be a plurality of traveling tracks corresponding to the satellites, a plurality of time parameters corresponding to the satellites, and a plurality of position parameters corresponding to the satellites.

The electronic device capable of searching satellites and method for searching satellites according to the present invention can firstly find out the target satellites according to the current position information and the current time information, and then search the target satellites based on the found-out target satellites and receive the satellite signals sent by the searched target satellites. Therefore, the satellites that are not likely to appear currently and overhead are excluded, such that the time for searching the satellites is reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The method for searching satellites according to the present invention is applicable to electronic devices capable of searching satellites. The present method may be implemented through installing software or firmware program corresponding to the present method in the electronic device to store the software or firmware program in a storage device of the electronic device. The processor of the electronic device executes the stored software or firmware program in connection with satellite positioning function to realize the method for searching satellites according to the present invention. At this point, the electronic device may be, but not limited to, a computer with the satellite positioning function, a mobile phone with the satellite positioning function, or a personal digital assistant (PDA) with the satellite positioning function, etc.

Figure 1:
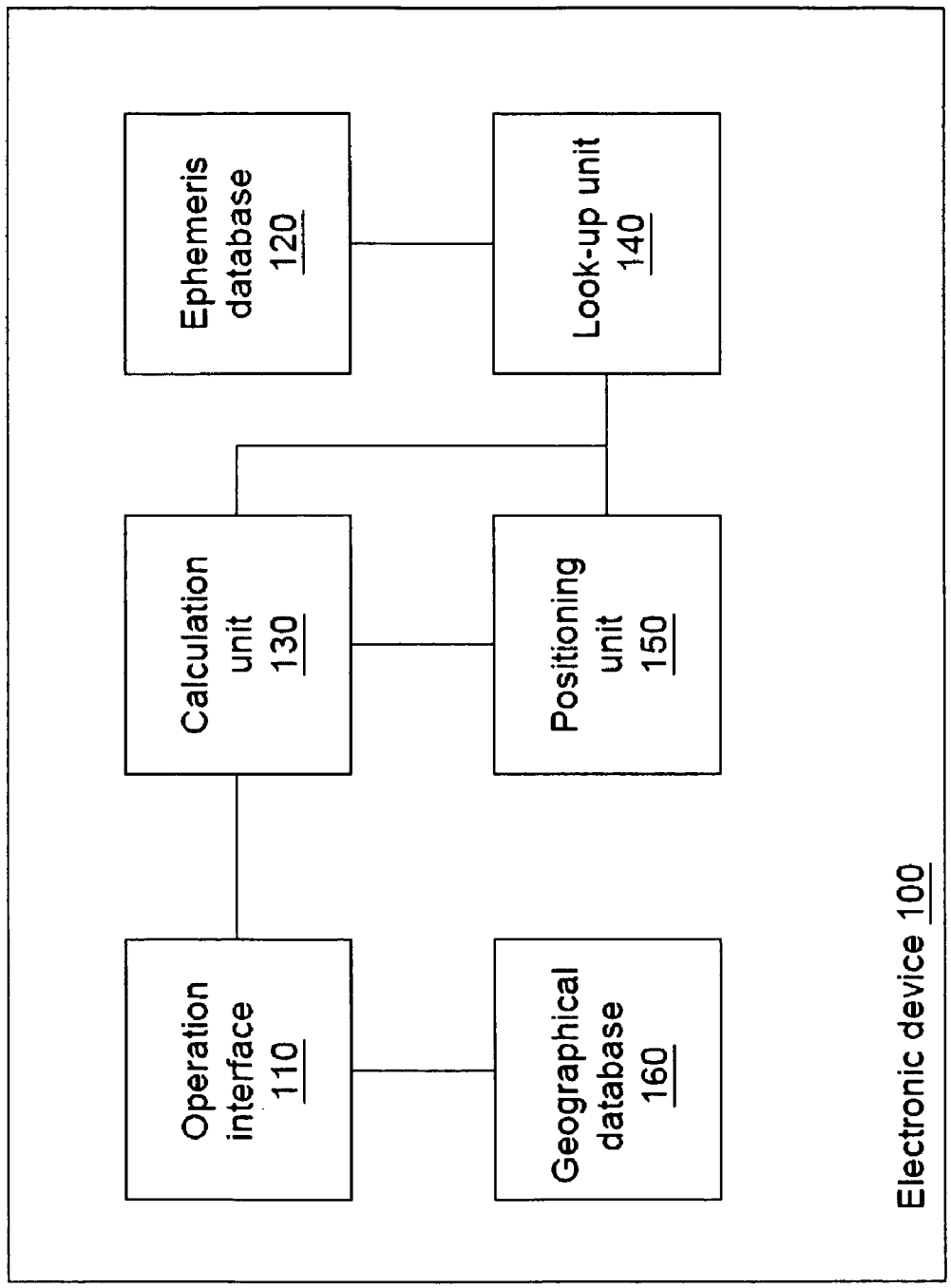
FIG. 1 is a schematic view of the architecture of an embodiment according to the present invention.

FIG. 1 is a schematic view of the architecture of an embodiment according to the present invention. Referring to FIG. 1, an electronic device 100 capable of searching satellites includes an operation interface 110, an ephemeris database 120, a calculation unit 130, a look-up unit 140, and a processor 150. The operation interface 110 is used to output the position information. The ephemeris database 120 is used to store a plurality of ephemeris data of the satellites. The calculation unit 130 is used to calculate the regional range according to the received position information. The look-up unit 140 is electrically connected to the ephemeris database 120, and used to find out the serial numbers of satellites corresponding to the time information and the regional range from the ephemeris data in the ephemeris database 120. The positioning unit 150 is electrically connected to the look-up unit 140, and is used to execute the satellite positioning operation according to the execution results of the calculation unit 130 and the look-up unit 140. For example, the positioning unit 150 can search the target satellites corresponding to the numbers in reality and then receive satellite signals from each searched target satellite, such as to position based on the received satellite signals. The calculation unit 130, the look-up unit 140, and the positioning unit 150 also can be implemented by single processor or more than one processor.

The position information described above may include the longitude and the latitude of the current position of the electronic device 100. At this point, the electronic device 100 may further include a geographical database 160 electrically connected to the operation interface 110, which is used to store the geographical position information and corresponding drawings. The operation interface 110 may display the content of the geographical database 160 in the form of a branching diagram or a list. A user inputs the current position of the electronic device 100 through the operation interface 110, and the geographical position information corresponding to the input current position is generated through the operation interface 110 as the position information. In addition, a regional range may be an active reception range in which the electronic device 100 receives the satellite signals.

In addition, the time information described above may be the system time of the electronic device 100 or the current time input by the user through the operation interface 110.

In addition, the ephemeris data may include the numbers for numbering the satellites actually circulating in the sky and the orbit parameters. The numbers in the ephemeris data is the ones corresponding to the satellites in the sky, respectively, and the numbers in the ephemeris data are not repetitive. The orbit parameters can include a plurality of traveling tracks corresponding to the satellites, a plurality of time parameters corresponding to the satellites, and a plurality of position parameters corresponding to the satellites.

Figure 2:
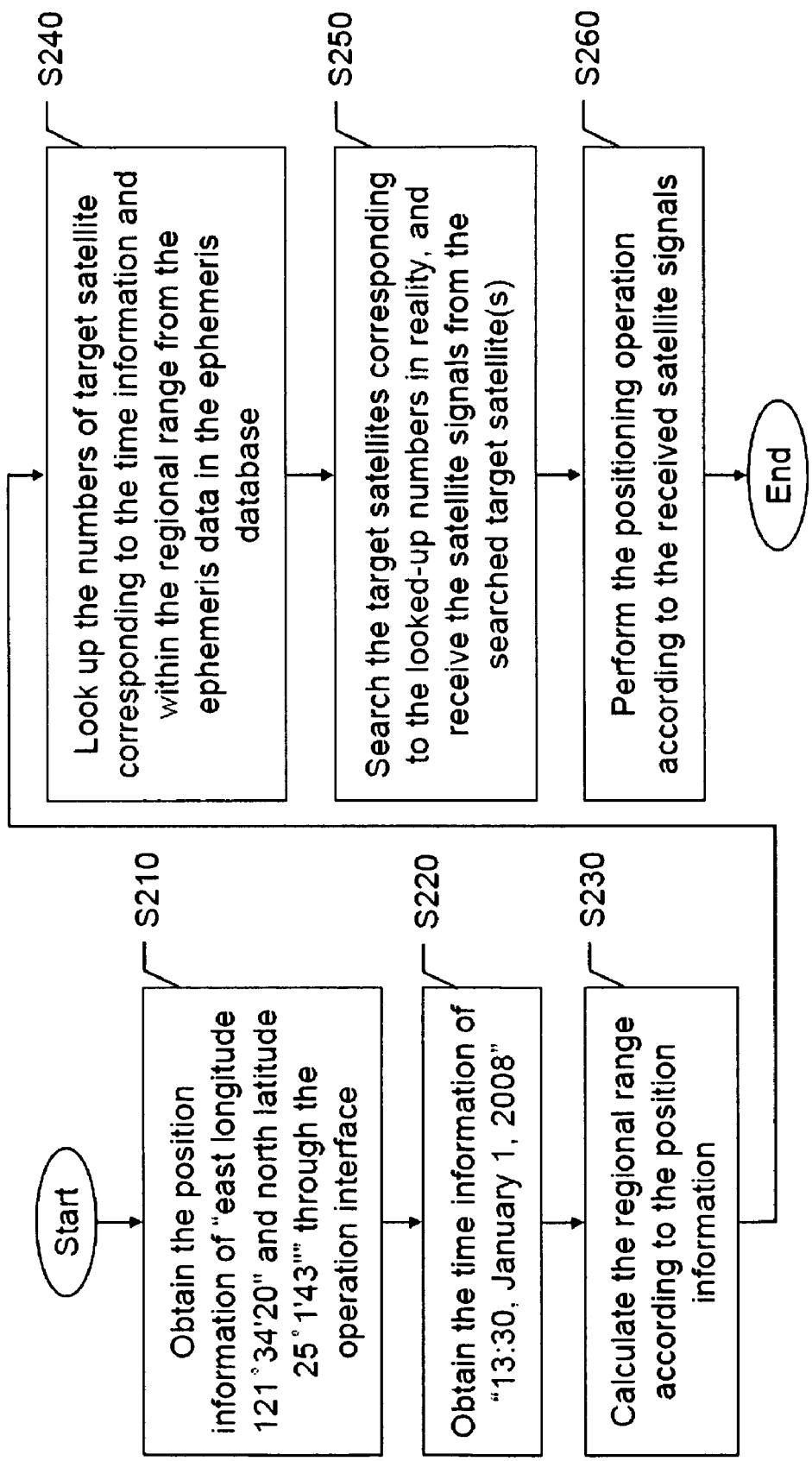
FIG. 2 is a schematic flow chart of an embodiment according to the present invention.

FIG. 2 is a schematic flow chart of an embodiment according to the present invention. For the ease of illustration, assuming that the obtained position is "101 building in Taipei", with the longitude being east longitude 121°34'20" and the latitude being north latitude 25°1'43". Assume that the obtained time information is "13:30, January 1, 2008". Assume that the calculated regional range is a circular regional range centered on the 101 building in Taipei and with a radius of 20 kilometers. Assume that the target satellite numbers found out are No. 5 satellite, No. 8 satellite, No. 15 satellite, No. 20 satellite, No. 23 satellite, No. 26 satellite, No. 27 satellite, and No. 31 satellite. Assume that the electronic device can receive the satellite signals from No. 5 satellite, No. 15 satellite, No. 20 satellite, and No. 31 satellite.

First, the position information of "east longitude 121°34'20" and north latitude 25°1'43"" is obtained through the operation interface (Step S210). Then, the time information of "13:30, January 1, 2008" is obtained (Step S220). The regional range is calculated according to the position information (Step S230). The numbers of target satellites (No. 5, 8, 15, 20, 23, 26, 27, and 31) corresponding to the time information and within the regional range are found out from the ephemeris data in the ephemeris database (Step S240). Then, the target satellites (No. 5, 8, 15, 20, 23, 26, 27, and 31 satellites) corresponding to the found-out numbers (No. 5, 8, 15, 20, 23, 26, 27, and 31) are searched, and then the satellite signals sent by the searched target satellites (No. 5, 15, 20, and 31 satellites) are received (Step S250). The positioning operation is performed based on the received satellite signals (from No. 5, 15, 20, and 31 satellites) (Step S260).

The position information described above may include the longitude and the latitude of the current position of the electronic device. At this point, the electronic device may further include a geographical database electrically connected to the operation interface, which is used for storing the geographical position information and corresponding drawings. The operation interface may display the content of the geographical database in the form of a branching diagram or a list. A user inputs the current position of the electronic device through the operation interface, and the geographical position information corresponding to the input current position is generated through the operation interface as the position information. In addition, a regional range may be an active reception range in which the electronic device receives the satellite signals.

In addition, the time information described above may be the system time of the electronic device or the current time input by the user through the operation interface.

At this point, the ephemeris data may include the numbers for numbering the satellites actually circulating in the sky and the orbit parameters. The numbers in the ephemeris data is the ones corresponding to the satellites in the sky, respectively, and the numbers in the ephemeris data are not repetitive. The orbit parameters include a plurality of traveling tracks corresponding to the satellites, a plurality of time parameters corresponding to the satellites, and a plurality of position parameters corresponding to the plurality of satellites.

The electronic device capable of searching satellites and method for searching satellites according to the present invention can firstly find out the target satellites according to the current position information and the current time information, and then searching the target satellites based on the found-out target satellites and receive the satellite signals sent by the searched target satellites. Therefore, the satellites that are not likely to appear currently and overhead are excluded, such that the time for searching the satellite is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for searching satellites, applied in an electronic device, the method comprising:
   obtaining a position information by a operating interface of the electronic device;
   obtaining a time information;
   calculating a regional range according to the position information by a calculation unit of the electronic device;
   finding out a plurality of numbers of target satellites corresponding to the time information and within the regional range from a plurality of ephemeris data in an ephemeris database included in the electronic device by a look-up unit of the electronic device; and
   searching the target satellites corresponding to the found-out numbers in reality, so as to receive satellite signals from each searched target satellite.

2. The method for searching satellites according to claim 1, wherein the position information includes a longitude and a latitude of a current position of the electronic device.

3. The method for searching satellites according to claim 1, wherein the time information is a system time of the electronic device.

4. The method for searching satellites according to claim 1, wherein the ephemeris data comprises:
   a plurality of numbers, for numbering a plurality of satellites actually circulating in the sky, wherein the numbers are different from each other and correspond to the satellites, respectively; and
   a plurality of orbit parameters, comprising a plurality of traveling tracks, a plurality of time parameters, and a plurality of position parameters corresponding to the satellites.

5. An electronic device capable of searching satellites, comprising:
   an operation interface, for outputting a position information;
   an ephemeris database, for storing a plurality of ephemeris data;
   a calculation unit, for calculating a regional range according to the received position information; and
   a look-up unit, electrically connected to the ephemeris database, for finding out a plurality of numbers of target satellites corresponding to a time information and within the regional range from the ephemeris data.

6. The electronic device capable of searching satellites according to claim 5, wherein the position information includes a longitude and a latitude of a current position of the electronic device.

7. The electronic device capable of searching satellites according to claim 5, wherein the time information is a system time of the electronic device.

8. The electronic device capable of searching satellites according to claim 5, wherein the ephemeris data comprises:
   a plurality of numbers, for numbering a plurality of satellites actually circulating in the sky, wherein the numbers are different from each other and correspond to the satellites, respectively; and
   a plurality of orbit parameters, comprising a plurality of traveling tracks, a plurality of time parameters, and a plurality of position parameters corresponding to the satellites.

* * * * *